United States Patent [19]

Lamparter

[11] Patent Number: 4,592,269
[45] Date of Patent: Jun. 3, 1986

[54] STATIC VENT DEVICE

[75] Inventor: Ronald C. Lamparter, Grosse Pointe Shores, Mich.

[73] Assignee: Transpec, Inc., Troy, Mich.

[21] Appl. No.: 698,886

[22] Filed: Feb. 6, 1985

[51] Int. Cl.$^4$ .............................................. B60H 1/26
[52] U.S. Cl. .................................. 98/2.14; 98/2.18
[58] Field of Search ................... 98/2.14, 2.15, 2.17, 98/2.18, 19, 20; 114/211, 212

[56] References Cited

U.S. PATENT DOCUMENTS

| | | | |
|---|---|---|---|
| 1,539,534 | 5/1925 | Anjell | 98/2.14 |
| 2,094,800 | 10/1937 | Lintern | 98/2.14 |
| 2,550,353 | 4/1951 | Hopfinger | 98/2.14 |
| 2,972,939 | 2/1961 | Tomlinson | 98/2.15 |
| 3,779,149 | 12/1973 | Bernard | 98/2.18 X |
| 4,079,985 | 3/1978 | Martin | 98/2.14 X |
| 4,537,119 | 8/1985 | Jarnot | 98/37 |

FOREIGN PATENT DOCUMENTS 63928  9/1945  Denmark ................... 98/20

Primary Examiner—Harold Joyce
Attorney, Agent, or Firm—Reising, Ethington, Barnard, Perry & Milton

[57] ABSTRACT

A static vent for a vehicle such as a bus wherein the interior of the vehicle is continuously vented to the atmosphere in such a way as to prevent the ingress of rain water to the vehicle compartment.

11 Claims, 6 Drawing Figures

STATIC VENT DEVICE

TECHNICAL FIELD

It is required by law in many states that commercial vehicles such as buses include a static vent system whereby the passenger compartment is at all times vented to the atmosphere. The purpose of such a static vent system is to insure that potentially noxious vapors have a way of being vented from the interior of the vehicle. Such a static system is particularly intended to draw ventilating air through the vehicle passenger compartment and exhaust the same as the vehicle is moving.

It is the purpose of the present invention to incorporate such a static vent system in the roof of a vehicle, such as a bus, in a way as to have minimum impact on the aerodynamics of airflow over the vehicle roof while at the same time creating a strong eductive force during the forward movement of the vehicle to cause a continuous flow of air out of the vehicle compartment. It is a further object of the invention to create such a static vent system wherein rain water is inhibited from flowing through the vent system into the vehicle interior.

Finally, it is an object of the present invention to provide a static vent system which may either be incorporated directly in the vehicle roof structure or made an integral part of a manually operable combined vehicle vent system and escape hatch mechanism.

BACKGROUND ART

In a most preferred form of the subject invention, the static vent device is incorporated in a combined vent and escape hatch mechanism such as shown in U.S. Pat. No. 4,021,073 Manning. Applicant is unaware of any prior art disclosing his static vent system and particularly wherein such system is incorporated in a manually openable combined vent and escape hatch system.

While applicant's static vent system can be incorporated by itself in a bus or vehicle roof panel, it is much more economical to incorporate such static vent system in the aforementioned combined vent and escape hatch system inasmuch as a basic opening has already been provided in the vehicle roof for this latter purpose and a major component of the static vent system can be integrally formed in the hatch cover.

DISCLOSURE OF THE INVENTION

A static vent system for a vehicle has the primary function of providing a continuous venting of the interior or passenger compartment of the vehicle to the atmosphere with the particular emphasis on preventing the build-up or accumulation of noxious or unhealthy vapors in the passenger compartment. Such systems normally have a limited venting capacity and are, therefore, intended to be most effective during the forward movement of the vehicle which causes an eduction or evacuating effect to draw air through the passenger compartment. There are several inherent problems with such static vent devices. First, if the vent system projects substantially above the vehicle roof structure, undesirable aerodynamic drag will be created reducing the operating efficiency of the vehicle. A secondary aspect of the first mentioned problem is an aesthetically unpleasing appearance. Next, since the static vent system is always in open communication with the atmosphere, there is the problem of ingress of rain water into the vehicle passenger compartment. This latter may be a problem either when the vehicle is moving or when the vehicle is parked.

While it is contemplated that applicant's static vent system can be directly incorporated into a bus roof structure in the case of those vehicles that do not have a passenger escape hatch system, it is most desirable to combine such static vent system with an escape hatch mechanism where such is provided and the invention will hereinafter be described in such latter environment.

In a vehicle incorporating a manually operable combined vent and escape hatch mechanism such as shown in Manning U.S. Pat. No. 4,021,073, when such hatch is in its closed position it projects only slightly above the vehicle roof structure. Hereinafter, when reference is made to a vehicle roof panel such may either be the roof of the vehicle itself or the outer panel of the escape hatch mechanism. Again, while the invention is not intended to be limited to a particular material, it is the common practice today to make the hatch mechanism of the aforementioned Manning patent out of structural plastic materials except for the hatch hinging mechanism.

In the subject static vent system an integral portion of a vehicle roof panel is raised vertically above the panel surface so as to form an air chamber which interiorly communicates with the vehicle passenger compartment. The raised integral portion of said roof panel includes a surface vertically spaced above the roof panel surface and which raised surface slopes downwardly toward the front end of the vehicle. Vent openings are formed through said raised surface so as to provide communication between the interior of the vehicle and the atmosphere. A cover member having the same general shape as the raised panel portion but being slightly larger than said portion is adapted to enclose and cooperate with said portion to define a plenum chamber. The cover member entirely encloses the raised panel portion except for a vent slot facing the rear of the vehicle.

In order for water to enter the passenger compartment through the static vent system, it must pass through the vent openings formed in the raised portion of the roof panel. Free-falling rain or water is prevented from entering such vent openings by the overlaying cover member. A next condition during which water could possibly enter the vehicle passenger compartment is where the vehicle is at rest and water collects on the vehicle roof surface. While such water could enter the plenum chamber defined by the cover member and the raised panel portion, the vent openings formed in such portion are in a surface raised several inches above the roof panel. Therefore, standing water will normally not reach the vertical level of the vent openings before it flows out the cover vent slot. Another condition which would tend to allow water to enter the vehicle compartment would be where rain is being blown from the rear toward the front of the vehicle. This type of water ingress is deterred in two ways. First, the surface in which the vent openings of the raised panel portion are formed slopes downwardly from the rear toward the front of the vehicle, thus the vent openings face away from the rear of the vehicle and the direction of windblown water. Secondly, baffle means are integrally formed in the vent opening surface and which baffle means coact with the cover member to laterally deflect away from said openings any water tending to flow over the raised panel portion.

Thus by elevating the vent openings of the raised panel portion above the panel surface and providing baffling means, both static water on the roof and wind-blown water are inhibited from entering the passenger compartment through the panel vent openings.

The advantages of applicant's invention will be more clearly understood and appreciated from the following detailed description and accompanying drawings.

BRIEF DECRIPTION OF DRAWINGS

BEST MODE FOR CARRYING OUT THE INVENTION

Figure 1:
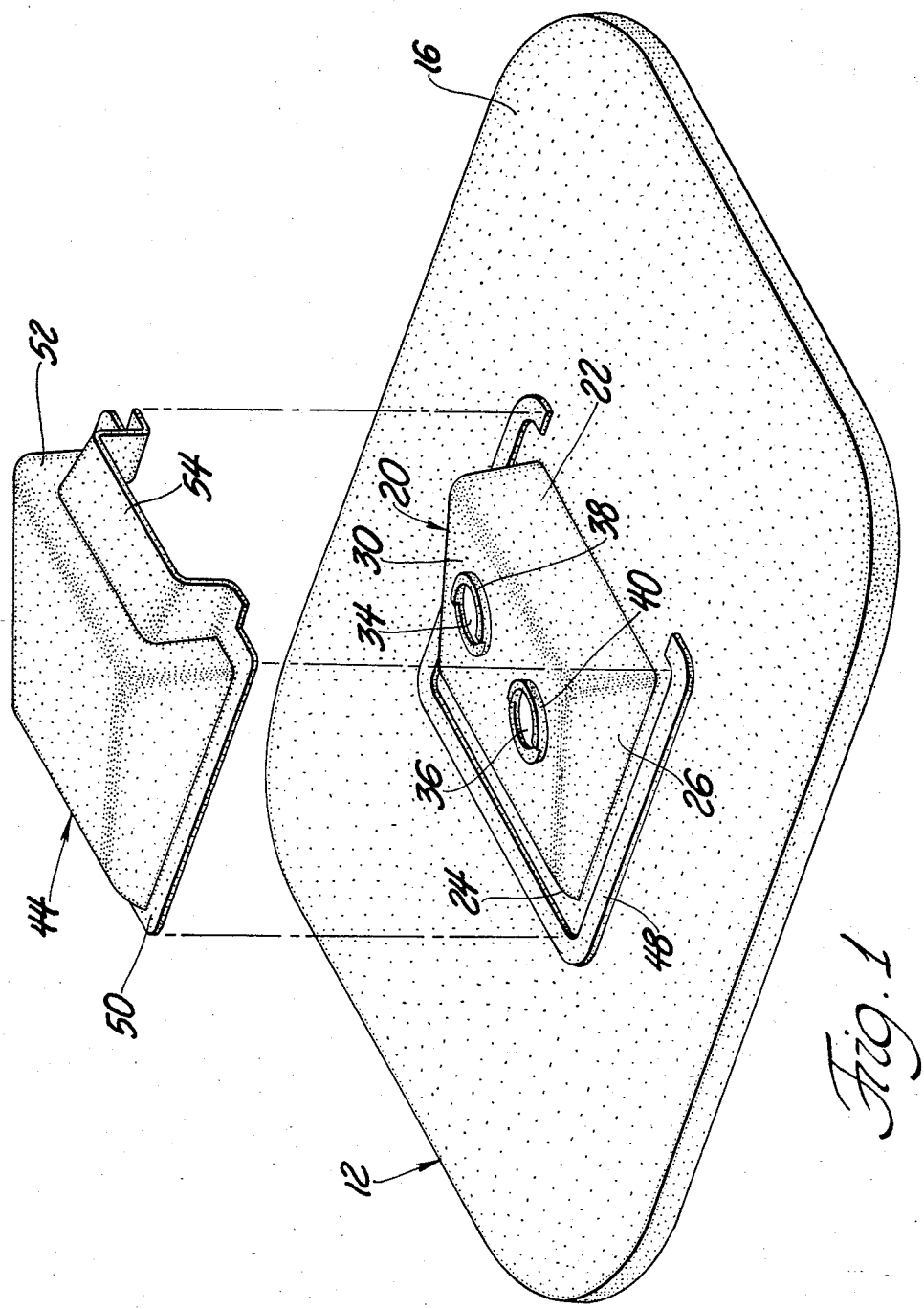
FIG. 1 is an exploded perspective view of a vehicle hatch incorporating the static vent device.
Figure 2:
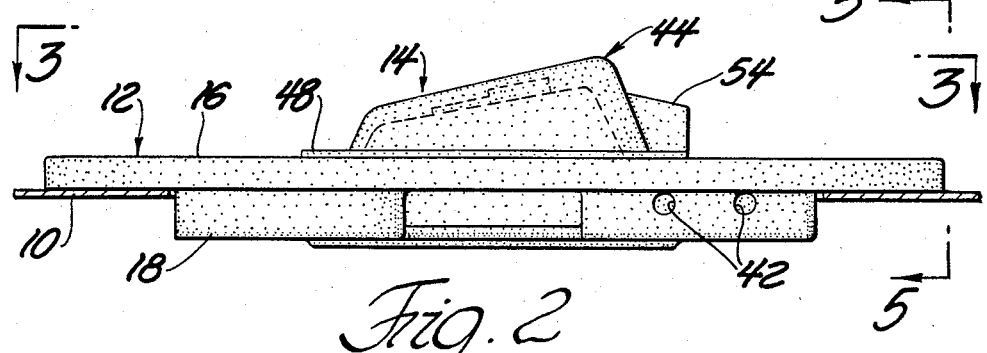
FIG. 2 is a side elevation showing the hatch member disposed within an opening in the vehicle roof.
Figure 3:
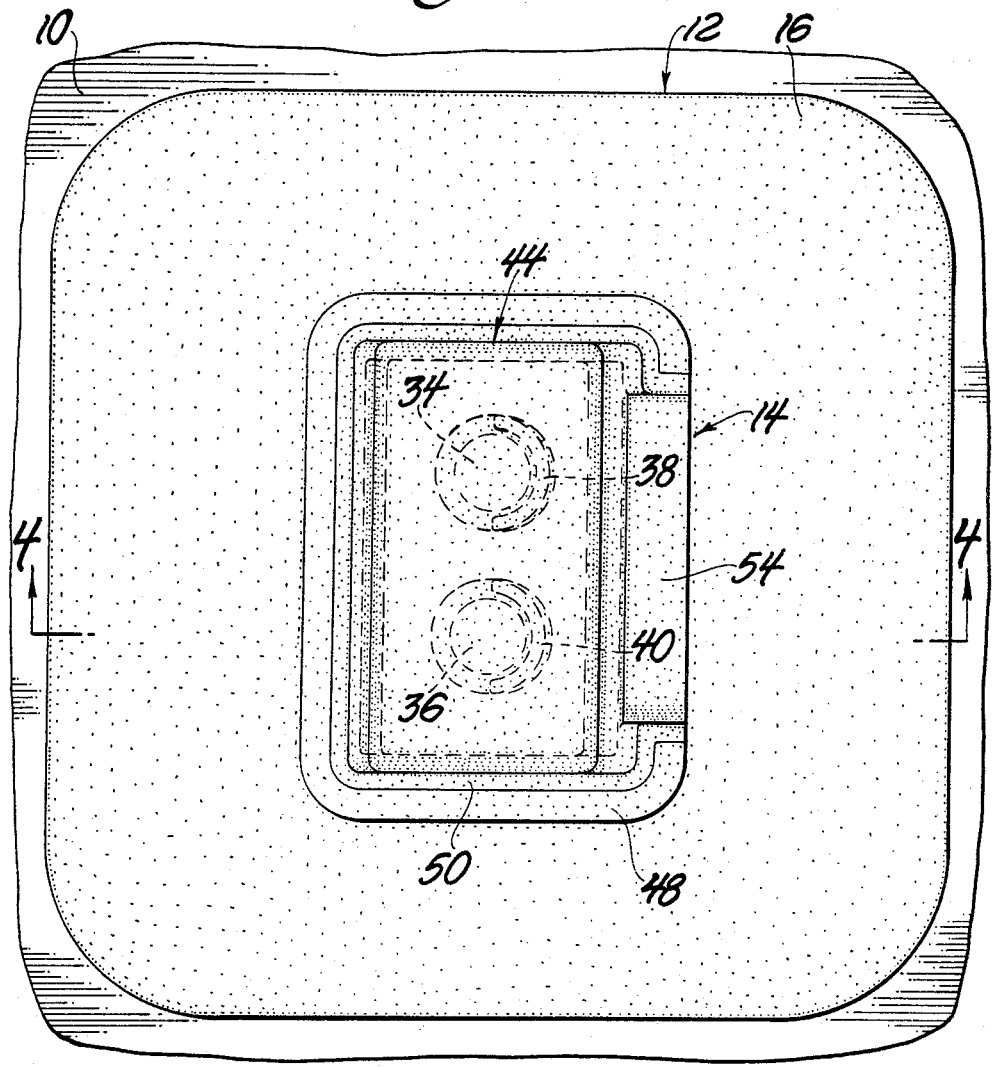
FIG. 3 is a plan view of the hatch with incorporated static vent device.

Referring first to FIGS. 1-3 of the drawings, a vehicle roof panel is indicated at 10 which includes an opening with which a manually openable hatch 12 is adapted to cooperate. The manually openable hatch 12 is of the type shown in U.S. Pat. No. 4,021,073 Manning and which is a combined vent and passenger escape system. A static vent device is indicated in the manually openable hatch system. Should such be desired, the static vent device could be incorporated directly in the vehicle roof panel 10 rather than being incorporated in the hatch 12.

Figure 4:
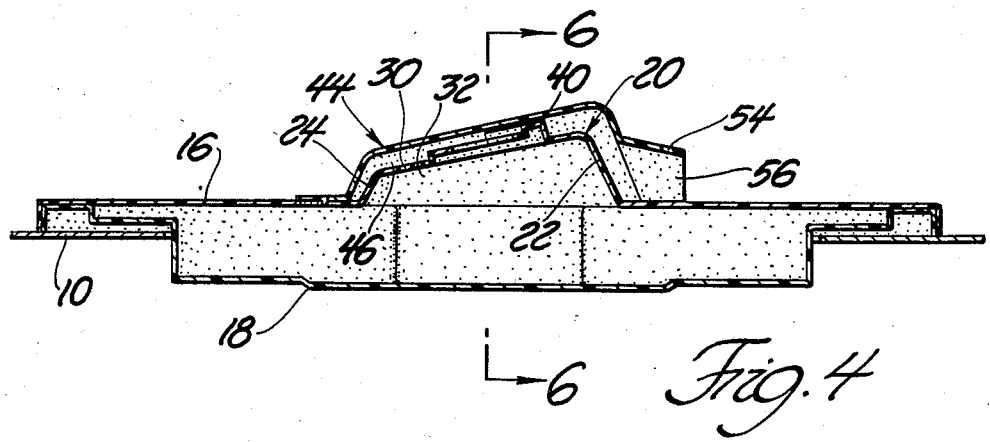
FIG. 4 is a cross-sectional view through the hatch and vent device along lines 4—4 of FIG. 3.
Figure 6:
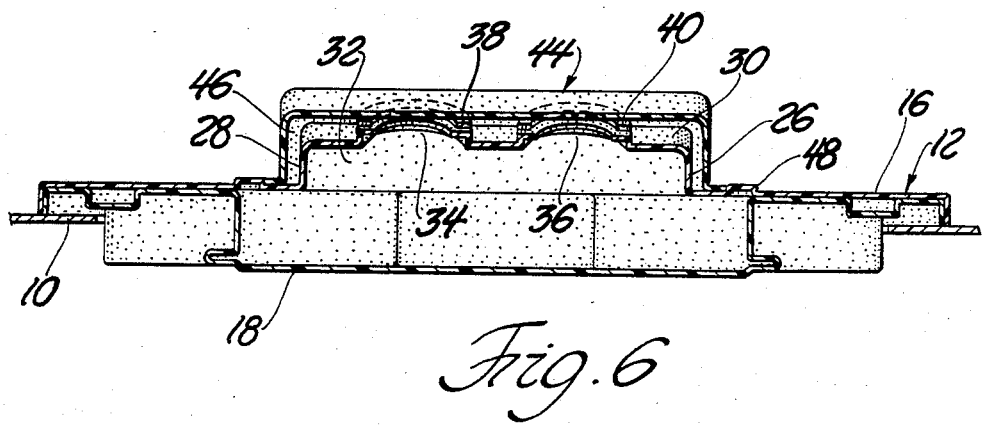
FIG. 6 is a cross-sectional view through the hatch and vent device along lines 6—6 of FIG. 4.

Hatch member 12 is generally hollow and includes an outer surface 16 disposed exteriorly of the vehicle and an inner surface or wall 18 adapted to be disposed within the vehicle compartment when the hatch is in its closed position as indicated in all views of the drawings. While it may be fabricated from other materials, it is preferred to make hatch 12 of an engineered plastic material such as:

Static vent device 14 includes a portion indicated generally at 20 formed integrally from the upper surface 16 of hatch 12 and is raised above said hatch surface. In FIGS. 1-4 the front of the vehicle is toward the left and the rear of the vehicle is toward the right. As best seen in FIGS. 1 and 4, the integral raised portion 20 has a wedge-shaped cross-section formed by a relatively higher rear wall 22 facing the rear of the vehicle and a relatively lower wall 24 facing the front of the vehicle. As best seen in FIG. 6, integral raised portion 20 also includes side wall portions 26 and 28. Raised portion 20 also includes a relatively planar upper wall or surface 30 extending between rear and front walls 22 and 24 and side walls 26 and 28. Upper wall 30 slopes downwardly from the rear toward the front of raised portion 20 and, in any case, wall 30 is disposed above upper surface 16 of hatch 12. In being raised above hatch surface 16, integral portion 20 forms an air chamber 32 which openly communicates the hollow interior of hatch 12 defined by the upper and lower hatch walls 18 and 20.

A pair of vent openings 34 and 36 are formed through raised portion wall 30 so as to communicate the air chamber 32 and the interior of the hollow hatch 12 with the atmosphere. For reasons which will subsequently be described, generally hemispherical ribs or baffles 38 and 40 are integrally formed around the rearwardly facing perimeter of vent openings 34 and 36.

Figure 5:
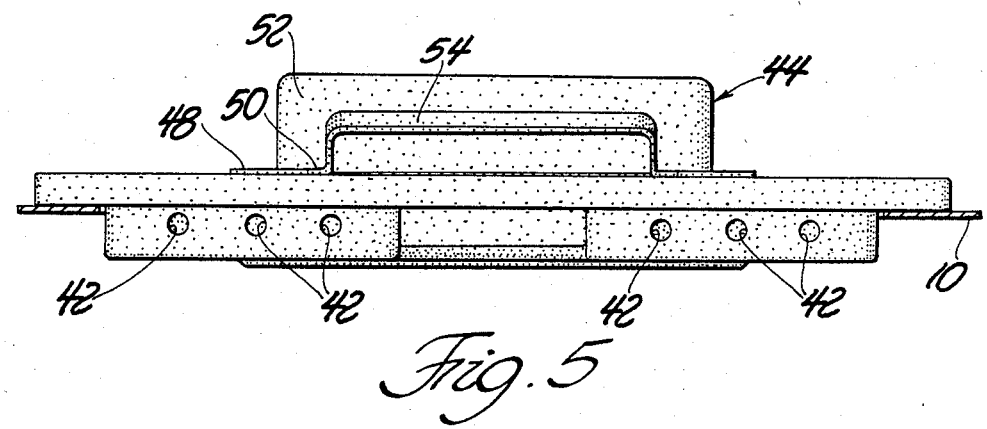
FIG. 5 is an end view of the hatch and vent device looking from the rear of the vehicle toward the front of the vehicle and along lines 5—5 of FIG. 2.

As best seen in FIGS. 2 and 5, inner wall 18 of hatch 12 includes a plurality of vent openings 42 which communicate the hollow interior of the hatch with the vehicle compartment. The total cross-sectional areas of vent openings 42 is equal to the combined areas of the vent openings 34 and 36 formed through raised portion 20.

The static vent device is completed by a cover member indicated generally at 44. Cover member 44 is generally of the same shape as integral raised portion 20 but is dimensionally larger so that when in place on hatch surface 16, the cover and integral raised portion 20 together define a plenum chamber 46.

A rearwardly facing wall 52 of cover member 44 is formed to provide a rearwardly extending overhang 54 and a transversely extending opening 56 which communicates the plenum chamber 46 with the atmosphere. As seen in FIG. 4, cover opening 56 is disposed vertically below the top of wall 22 of raised panel portion 20 whereby water entering the opening is deflected by wall 22 away from vent openings 34 and 36.

As previously noted, static vent devices are normally required by state laws in order to insure that the interior or passenger compartment of a vehicle is continuously vented to the atmosphere to prevent the accumulation of noxious or otherwise undesirable gases within such compartment. As the vehicle moves forwardly, or from right to left as viewed in FIGS. 2 and 4, air flow over the vehicle roof and hatch will have an eductive effect causing a limited amount of air to flow out of the vehicle passenger compartment through hatch vent openings 42, air chamber 32, through raised vents 34 and 36, plenum chamber 46 and to be evacuated through cover opening 56.

The problem with such a static vent device is preventing or inhibiting rain water from flowing through the device into the vehicle passenger compartment. This possibility is greatly reduced with applicant's device for the following reasons. First, the vent openings 34 and 36 which communicate with air chamber 32 and the hollow interior of the hatch 21 are raised several inches above the outer surface 16 of vent escape hatch 12 and roof panel 10. Thus, any rain water collecting on the vehicle roof will not enter the vent openings 34 and 36 but rather would simply run off the roof before accumulating to a sufficient depth to enter the vent openings. Next, in that condition where the bus or vehicle is parked and rain is being driven by wind from the rear toward the front of the vehicle, such wind bearing water is deflected away from the vent openings 34 and 36 first by the relatively high rearwardly facing wall 22 of raised portion 20 and thereafter by semicircular baffles or ribs 38 and 40 which will deflect such water around the vent openings and downwardly to the outer surface 16 of atch 12.

It is apparent that various minor changes in the parts or their arrangement may be made within the intended scope of the invention as hereinafter claimed.

What is claimed is:

1. A vehicle vent device adapted to permit communication through a vehicle roof panel such that the vehicle passenger compartment is continuously vented to the outside atmosphere in a way to limit the ingress of water through said device, said device comprising:

A. An integral portion (20) of said roof panel raised vertically above the panel surface (16) to form an air chamber (32) which communicates with the vehicle passenger compartment, said integral portion including
  (1) a generally planar surface (30) vertically spaced above the roof panel surface and sloping downwardly toward the front of the vehicle,
  (2) vent opening means (34–36) formed through said planar surface and disposed above said panel surface and,
B. a cover member (44) enclosing said integral panel portion so as to define a plenum (46) therewith, said cover member including an opening (56) facing the rear of the vehicle whereby the plenum, vent opening means and the air chamber communicate the inside of the vehicle with the outside atmosphere.

2. A vehicle vent device adapted to permit communication through a vehicle roof panel such that the vehicle passenger compartment is continuously vented to the outside atmosphere in a way to limit the ingress of water through said device, said device comprising:
A. an integral portion (20) of said roof panel raised vertically above the panel surface (16) to form an air chamber (32) which communicates with the vehicle passenger compartment, said integral portion including
  (1) a generally planar surface (30) vertically spaced above the roof panel surface and sloping downwardly toward the front of the vehicle,
  (2) vent opening means (34–36) formed through said planar surface and disposed above said roof panel surface,
B. a cover member (44) enclosing said integral panel portion so as to define a plenum (46) therewith, said cover member including an opening (56) facing the rear of the vehicle whereby the plenum, vent opening means and the air chamber communicate the inside of the vehicle with the outside atmosphere, and
C. baffle means (38–40) disposed between the vent opening means and said cover member to deflect water from entering said opening means through the cover opening.

3. A vehicle vent device adapted to permit communication through a vehicle roof panel such that the vehicle passenger compartment is continuously vented to the outside atmosphere in a way to limit the ingress of water through said device, said device comprising:
A. an integral portion (20) of said roof panel raised vertically above the panel surface (16) to form an air chamber (32) which communicates with the vehicle passenger compartment, said integral portion including
  (1) a generally planar surface (30) vertically spaced above the roof panel surface and sloping downwardly toward the front of the vehicle,
  (2) vent opening means (34–36) formed through said planar surface and disposed above said roof panel surface,
B. a cover member (44) enclosing said integral panel portion so as to define a plenum (46) therewith, said cover member including an opening (56) facing the rear of the vehicle whereby the plenum, vent opening means and the air chamber communicate the inside of the vehicle with the outside atmosphere, and
C. a raised rib element (48) formed in said panel surface and laterally spaced from the raised panel portion, said rib being adapted to center said cover member relative to said raised panel portion.

4. A vehicle vent device of the type set forth in claim 3 wherein said rib element (48) substantially surrounds the raised panel portion, said cover including a laterally extending flange portion (50) adapted to laterally abut against said rib element.

5. A vehicle vent device adapted to permit communication through a vehicle roof panel such that the vehicle passenger compartment is continuously vented to the outside atmosphere in a way to limit the ingress of water through said device, said device comprising:
A. an integral portion (20) of said roof panel raised vertically above the panel surface (16) to form an air chamber (32) which communicates with the vehicle passenger compartment, said raised integral portion having
  (1) a generally wedge-shaped cross-section with the highest side (22) of the wedge facing the rear of the vehicle and the lowest side (24) of the wedge facing the front of the vehicle,
  (2) a generally planar surface (30) disposed between the high and low sides of the wedge and vertically spaced above the roof panel surface,
  (3) vent opening means (34–36) formed through said planar surface, said vent opening means being vertically disposed below the highest side and above the lowest side of said wedge, and
B. a cover member (44) enclosing said integral panel portion so as to define a plenum therewith, said cover member including an opening (56) facing the rear of the vehicle whereby the plenum, vent opening means and the air chamber communicate the inside of the vehicle with the outside atmosphere.

6. A vehicle vent device as set forth in claim 5 wherein said cover member (44) is generally of the same wedge-shaped configuration as the integral raised portion of said roof panel.

7. A vehicle vent device as set forth in claim 6 wherein said cover member (44) includes a rear wall (52) generally parallel to and rearwardly spaced from the high side (22) of the integral portion of said panel, said cover opening (56) being formed in said rear wall and being disposed vertically below the highest edge of the planar surface (30) of the integral panel portion.

8. A vehicle vent device adapted to permit communication through a vehicle roof panel such that the vehicle passenger compartment is continuously vented to the outside atmosphere in a way to limit the ingress of water through said device, said device comprising:
A. an integral portion (20) of said roof panel raised vertically above the panel surface (16) to form an air chamber (32) which communicates with the vehicle passenger compartment, said raised integral portion having
  (1) a generally wedge-shaped cross-section with the highest side (22) of the wedge facing the rear of the vehicle and the lowest side (24) of the wedge facing the front of the vehicle,
  (2) a generally planar surface (30) disposed between the high and low sides of the wedge and vertically spaced above the roof panel surface,
  (3) vent opening means (34–36) formed through said planar surface, said vent opening means being vertically disposed below the highest side and above the lowest side of said wedge, B. a cover member (44) enclosing said integral panel portion so as to define a plenum (46) therewith, said cover member including an opening (56) facing the rear of the vehicle whereby the plenum, vent opening means and the air chamber communicate the inside of the vehicle with the outside atmosphere, and C. baffle means (38-40) integrally formed on said planar surface to deflect water from entering said vent opening means through the cover opening.

9. A vehicle vent device as set forth in claim 8 wherein said cover member (44) is generally of the same wedge-shaped configuration as the integral portion (20) of said roof panel, said cover member including an upper wall parallel to and spaced above the planar surface (30) of said raised integral portion of the roof panel, said upper wall abutting against said baffle means (38-40).

10. A vehicle vent and escape hatch mechanism of the type wherein the hatch is adapted to be raised from a normally closed position against the vehicle roof to provide either ventilation or passenger escape from the vehicle, the improvement being a static vent device adapted to permit communication through the hatch such that the vehicle passenger compartment is vented to the outside atmosphere when the hatch is closed and in a way to limit the ingress of water through said device, said device comprising:

A. an integral portion (20) of said hatch being raised vertically above the outer hatch surface (16) to form an air chamber (32) which communicates with the vehicle passenger compartment, said integral portion including
  (1) a generally planar surface (30) vertically spaced above the roof panel surface and sloping downwardly toward the front of the vehicle,
  (2) vent opening means (34-36) formed through said planar surface and, B. a cover member (44) enclosing said integral hatch portion so as to define a plenum (46) therewith, said cover member including an opening (56) facing the rear of the vehicle whereby the plenum, vent opening means and the air chamber communicate the inside of the vehicle with the outside atmosphere.

11. A vent and escape hatch mechanism of the type set forth in claim 10 wherein the hatch (12) is hollow and includes a bottom wall (18) adapted to face the vehicle passenger compartment, said wall including a plurality of vent openings (42) communicating the compartment with said air chamber.

* * * * *

UNITED STATES PATENT AND TRADEMARK OFFICE
CERTIFICATE OF CORRECTION

PATENT NO. : 4,592,269

DATED : 6-3-86

INVENTOR(S) : Ronald C. Lamparter

It is certified that error appears in the above—identified patent and that said Letters Patent is hereby corrected as shown below:

Column 3, line 45 after as: insert NORYL which is the trademark of the General Electric Company used to identify this particular engineering resin.

Column 4, line 45 after hatch change the numeral 21 to 12

Column 4, line 58 the atch should read hatch.

Signed and Sealed this

Sixteenth Day of September 1986

[SEAL]

Attest:

DONALD J. QUIGG

Attesting Officer

Commissioner of Patents and Trademarks